United States Patent [19]

Baldwin

[11] 4,425,588
[45] Jan. 10, 1984

[54] PROCESSING OF DIGITAL SIGNALS

[76] Inventor: John L. E. Baldwin, Hampshire, England

[21] Appl. No.: 230,034

[22] Filed: Jan. 30, 1981

[51] Int. Cl.³ .......................... H04N 5/91; H04N 5/21
[52] U.S. Cl. .................................... 358/340; 358/138; 358/167
[58] Field of Search ................ 250/578; 358/127, 133, 358/138, 166, 167, 335, 336, 340; 360/32, 39; 364/200, 900, 724; 375/14, 96, 103

[56] References Cited

U.S. PATENT DOCUMENTS

| | | | |
|---|---|---|---|
| 4,306,249 | 12/1981 | Croll | 358/133 |
| 4,320,416 | 3/1982 | Dischert et al. | 358/133 |
| 4,323,916 | 4/1982 | Dischert et al. | 358/133 X |
| 4,328,425 | 5/1982 | Stoffel | 250/578 |
| 4,328,426 | 5/1982 | D'Ortenzio | 250/578 |

Primary Examiner—Bernard Konick
Assistant Examiner—Donald McElheny, Jr.
Attorney, Agent, or Firm—Laubscher, Philpitt & Laubscher

[57] ABSTRACT

Apparatus is disclosed for use in a digital signal transmission or recording system, particularly for video signals where, as is customary, the number of digital signals (i.e., digital words) is reduced (for example, by a factor of 2) prior to transmission or recording. The apparatus is operable to determine when a digital word fed to an input filter has a characteristic similar to that of a filtered word so that such a word can bypass the input filter and be transmitted or recorded without further filtering. This is achieved by monitoring the words input to the input filter and then operating a bypass around the input filter when the monitoring circuit detects that an input word has a characteristic similar to a filtered word.

10 Claims, 6 Drawing Figures

PROCESSING OF DIGITAL SIGNALS

STATEMENT OF THE INVENTION

The present invention relates to the processing of digital information and more particularly to apparatus for processing digital video signals in a television system.

BRIEF DESCRIPTION OF THE PRIOR ART

Digital apparatus for processing television signals has previously been proposed and amongst such apparatus has been proposed digital video tape recorders and transmission equipment for transmitting and/or receiving digital video signals.

The digital signals are usually produced by sampling an analogue signal at a predetermined frequency and digitalizing the samples by allocating each of them to a particular level. The number of levels is one factor in determining the accuracy of the procedure as is also the number of bits in the digital word representing each sample. Another factor is the number of samples taken in a given time i.e. the sampling frequency. It is apparent that the greater the sampling frequency the greater is the potential accuracy. Thus, one would expect the sampling frequency to be chosen as high as possible and this is what happens in practice but one difficulty with a high sampling frequency is that at certain points in a digital television system, e.g. video tape recording, there is a need to reduce the number of samples for, say, bandwidth considerations.

It has been proposed to reduce the number of samples, i.e., the word rate, by using a digital dividing circuit acting on the digital words after they have passed through a digital input filter. This is satisfactory and allows one to, for example, record the signal. On playback the original number of words can be reconstituted using an output interpolating filter. Such a pair of operations is termed a "generation". In many practical cases there are a number of "generations" before the final T.V. picture is produced (e.g., when using "Chroma Keying" techniques). If input and output filtering is conducted at each "generation" there would be a loss of resolution at each "generation" due to the sloping characteristic of the filter. This is a serious disadvantage and is likely to be proportionately more serious for the chrominance component signals.

SUMMARY OF THE INVENTION

It is an object of the present invention to monitor a digital signal, to see if it has been filtered before and to control whether or not further filtering is effected.

Advantageously, a special class of filters is used as the input filter and even more advantageously the checking and filtering apparatus are combined into a single unit so that certain parts can be used in common.

BRIEF DESCRIPTION OF THE DRAWING

In order that the present invention be more readily understood an embodiment thereof will now be described by way of example with reference to the accompanying drawings, in which.

DETAILED DESCRIPTION

Figure 1:
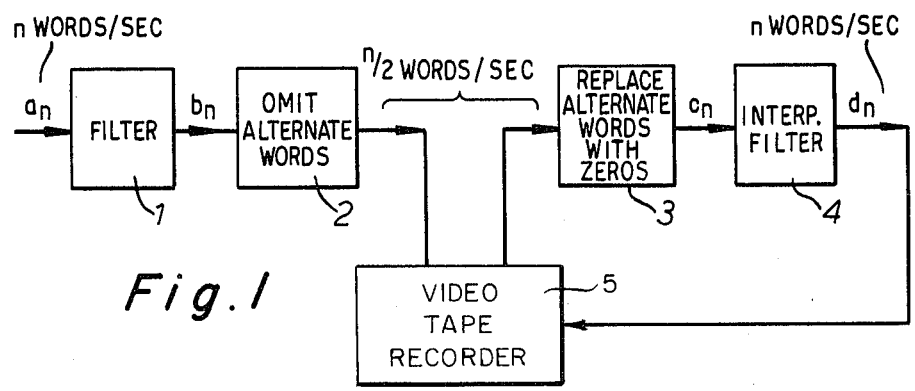
FIG. 1 shows in diagrammatic form a basic system for reducing the number of digital words in a digital signal and reconstructing the original number of words.

FIG. 1 shows in block diagram form the basic parts of a digital video system used to perform a "generation". It is to be assumed that the input to the system shown in FIG. 1 is already in digital form i.e. it is made up of a series of digital words each constituted by a plurality of bits, e.g., 8 bits.

The input digital words $a_o, a_1$ to $a_n$ are passed through a digital filter 1 to produce filtered words $b_o, b_1, -b_n$ before being processed in a selection circuit 2 where predetermined words are removed in order to reduce the total number of words which need to be acted upon by subsequent apparatus e.g. a video tape recorder 5. In the present example alternate words are removed to half the total number of words.

If it is desired to reconstitute the signal after processing, e.g., in the recorder, it is necessary to feed the processed digital signals through a circuit 3 which replaces alternate words with zeros and then to feed the resultant signal through an interpolation filter 4 which is preferably, though not necessarily identical to the input filter 1. It is apparent that if every time a "generation" takes place there will be a degradation in the output from the interpolation filter 4 which will have become progressively more severe the larger the number of "generations".

Figure 2:
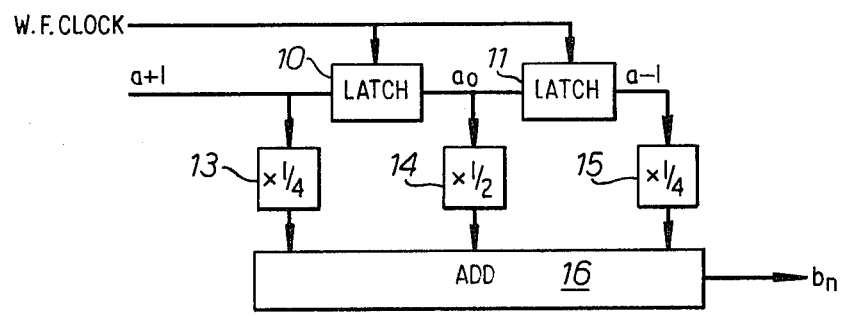
FIG. 2 shows an input filter for use in the apparatus of FIG. 1.

FIG. 2 shows one type of filter according to the present invention which can be used as the input filter 1. It comprises two word latches 10 and 11 connected in series and clocked by a clock signal at work frequency. Proportions of three input words are added together to produce an output word using multiplying circuits 13, 14, 15 and an adding circuit 16.

If one considers input digital words $a_o$, $a_1$, $a_2$, $a_3$ then the output words from the adding circuit 16 will be a series of words b of the following form:

$$b_0 = \tfrac{1}{4} a_{-1} + \tfrac{1}{2} a_0 + \tfrac{1}{4} a_1$$

$$b_1 = \tfrac{1}{4} a_0 + \tfrac{1}{2} a_1 \tfrac{1}{4} a_2$$

$$b_3 = \tfrac{1}{4} a_1 + \tfrac{1}{2} a_2 + \tfrac{1}{4} a_3$$

Figure 3:
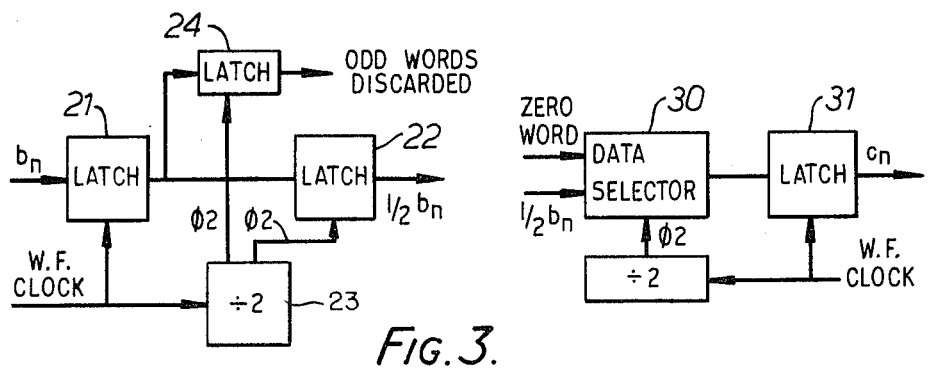
FIG. 3 shows further parts of the apparatus of FIG. 1.

These words b are then fed to the circuit 2 which is diagrammatically represented on the left hand side of FIG. 3 and which is seen to comprise an input word latch 21 driven by the word frequency clock, and a further latch 22 driven at one half of the word frequency from a divide-by-2 circuit 23. A further latch 24 is shown driven by the opposite phase of the circuit 23 but this will not normally be present. The output is taken from the latch 22 and will be a series of digital words, the series being constituted by alternate ones of the series of words b fed to the latch 21.

The output of the latch 22 can now be recorded or transmitted, but if it is wished to reconstruct the original signal constituted by the words a it is necessary to increase the number of words to the original number by inserting a zero word between the words which have been recorded or transmitted, for example. This is achieved using the circuitry shown on the right hand side of FIG. 3. The circuitry comprises a data selector switch 30 driven at half word frequency and the output of which will be either a word b or else a zero word since a zero word is fed to the other input of the selector switch. The output of the data selector is then latched at word frequency by a word latch 31 to produce a series of words c which may, in this example be constituted as follows:

$c_{-1} = 0$ $c_0 = b_0 = \frac{1}{4}a_{-1} + \frac{1}{2}a_0 + \frac{1}{4}a_1$ $c_1 = 0$ $c_2 = b_2 = \frac{1}{4}a_1 + \frac{1}{2}a_2 + \frac{1}{4}a_3$ $c_3 = 0$ etc.

Figure 4:
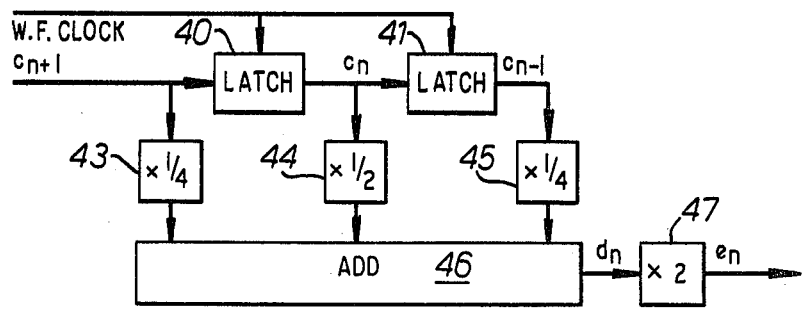
FIG. 4 shows a further part of the apparatus of FIG. 1.

The words c are then fed to the interpolation filter 4 which is shown in more detail in FIG. 4. It will be seen to be identical in construction to the input filter 1 and will therefore not be described in detail; suffice to say that the output from the filter is a series of words d which may, in this example be constituted as follows $d_0 = \frac{1}{8}a_{-1} + \frac{1}{4}a_0 + \frac{1}{8}a_1$ $d_1 = 1/16 a_{-1} + 1/50\, a_0 + \frac{1}{8}a_1 + \frac{1}{8}a_2 + 1/16 a_3$ $d_2 = \frac{1}{8}a_1 + \frac{1}{4}a_2 + \frac{1}{8}a_3$ $d_3 = 1/16 a_1 + \frac{1}{8}a_2 + \frac{1}{8}a_3 + \frac{1}{8}a_4 + 1/16 a_5$ etc.

The words d are then multiplied by 2 by the circuit 47 to produce words e whereby $e_0 = 2d_0$ $e_1 = 2d_1$ etc.

When such systems are cascaded the output $e_n$ of one system becomes the input $a_n$ of another. When items of equipment may or may not be cascaded and it is desired that the frequency response should not depend on whether the signal has been through one or many such systems this can be arranged, providing the filters are of such a form that there is only one non-zero multiplying coefficient in the set of coefficients spatially separated by a number of words equal to the higher divided by the lower word rate. For a two to one reduction of word rate the following filters meet this requirement.

One dimensional i.e. a line filter

| | | | | | | | | | | | |
|---|---|---|---|---|---|---|---|---|---|---|---|
| Specific | 0 | 0 | 0 | 0 | $\frac{1}{4}$ | $\frac{1}{2}$ | $\frac{1}{4}$ | 0 | 0 | 0 | 0 |
| General | $k_{-5}$ | 0 | $k_{-3}$ | 0 | $k_{-1}$ | $k_o$ | $k_1$ | 0 | $k_3$ | 0 | $k_5$ |

Two dimensional - Specific case 1

| | | | | |
|---|---|---|---|---|
| 0 | 0 | 0 | 0 | 0 |
| 0 | 0 | $\frac{1}{8}$ | 0 | 0 |
| 0 | $\frac{1}{8}$ | $\frac{1}{2}$ | $\frac{1}{8}$ | 0 |
| 0 | 0 | $\frac{1}{8}$ | 0 | 0 |
| 0 | 0 | 0 | 0 | 0 |

Specific case 2

| | | | | | | |
|---|---|---|---|---|---|---|
| 0 | 0 | 0 | 0 | 0 | 0 | 0 |
| 0 | 0 | $-1/64$ | 0 | $-1/64$ | 0 | 0 |
| 0 | $-1/64$ | 0 | 5/32 | 0 | $-1/64$ | 0 |
| 0 | 0 | 5/32 | $\frac{1}{2}$ | 5/32 | 0 | 0 |
| 0 | $-1/64$ | 0 | 5/32 | 0 | $-1/64$ | 0 |
| 0 | 0 | $-1/64$ | 0 | $-1/64$ | 0 | 0 |
| 0 | 0 | 0 | 0 | 0 | 0 | 0 |

General

| | | | | | | |
|---|---|---|---|---|---|---|
| 0 | $k_{(-3,-2)}$ | 0 | $k_{(-3,0)}$ | 0 | $k_{(-3,2)}$ | 0 |
| $k_{(-2,-3)}$ | 0 | $k_{(-2,-1)}$ | 0 | $k_{(-2,1)}$ | 0 | $k_{(-2,3)}$ |
| 0 | $k_{(-1,-2)}$ | 0 | $k_{(-1,0)}$ | 0 | $k_{(-1,1)}$ | 0 |
| $k_{(0,-3)}$ | 0 | $k_{(0,-1)}$ | $k_{(0,0)}$ | $k_{(0,1)}$ | 0 | $k_{(0,3)}$ |
| 0 | $k_{(1,-2)}$ | 0 | $k_{(1,0)}$ | 0 | $k_{(1,2)}$ | 0 |
| $k_{(2,-3)}$ | 0 | $k_{(2,-1)}$ | 0 | $k_{(2,1)}$ | 0 | $k_{(2,3)}$ |
| 0 | $k_{(3,-2)}$ | 0 | $k_{(3,0)}$ | 0 | $k_{(3,2)}$ | 0 |

These two dimensional cases for a regular sequence of omitted words from line to line assume an odd number of initial words per line. Further it is believed that an odd number of non-zero terms are needed for an even integer ratio for word rate reduction.

In the original case if n is even $$e_{n-1} = \frac{e_{n-2} + e_n}{2}$$

and that $$e_{n+1} = \frac{e_n + e_{n+2}}{2}$$

as a result of the filtering operation.

If therefore $$a_{n-1} = \frac{a_{n-2} + a_n}{2} \text{ and } a_{n+1} = \frac{a_n + a_{n+2}}{2}$$

at the input to any filter this can only have occurred if either it has already been filtered or if not, it has the characteristics of a filtered signal. By way of example this latter case would occur in a uniform field where every signal is the same.

Whenever this occurs the value of $a_n$ may be used directly in place of $b_n$. This is sufficient to ensure that the value of $b_n$ in the first and all succeeding coders are identical and prevents successive filtering in all parts of the picture which have already been filtered. It should be remembered that in a special effects unit the foreground scene might not have been filtered whereas the background scene had been filtered or vice versa.

More generally if n is even and the filter is of the type $k_{-3}$, 0, $k_{-1}$, $k_O$, $k_{+1}$, 0, $k_{+3}$ etc. and if such terms as $$k_{-3}a_{n-4} + k_{-1}a_{n-2} + k_1 a_n + k_3 a_{n+2} - k_o a_{n-1} = 0 \quad 1$$

and $$k_{-3}a_{n-2} + k_{-1}a_n + k_1 a_{n+2} + k_3 a_{n+4} - k_o a_{n+1} = 0 \quad 2$$

then the signal should be treated as having been filtered and should bypass the filter.

Figure 5:
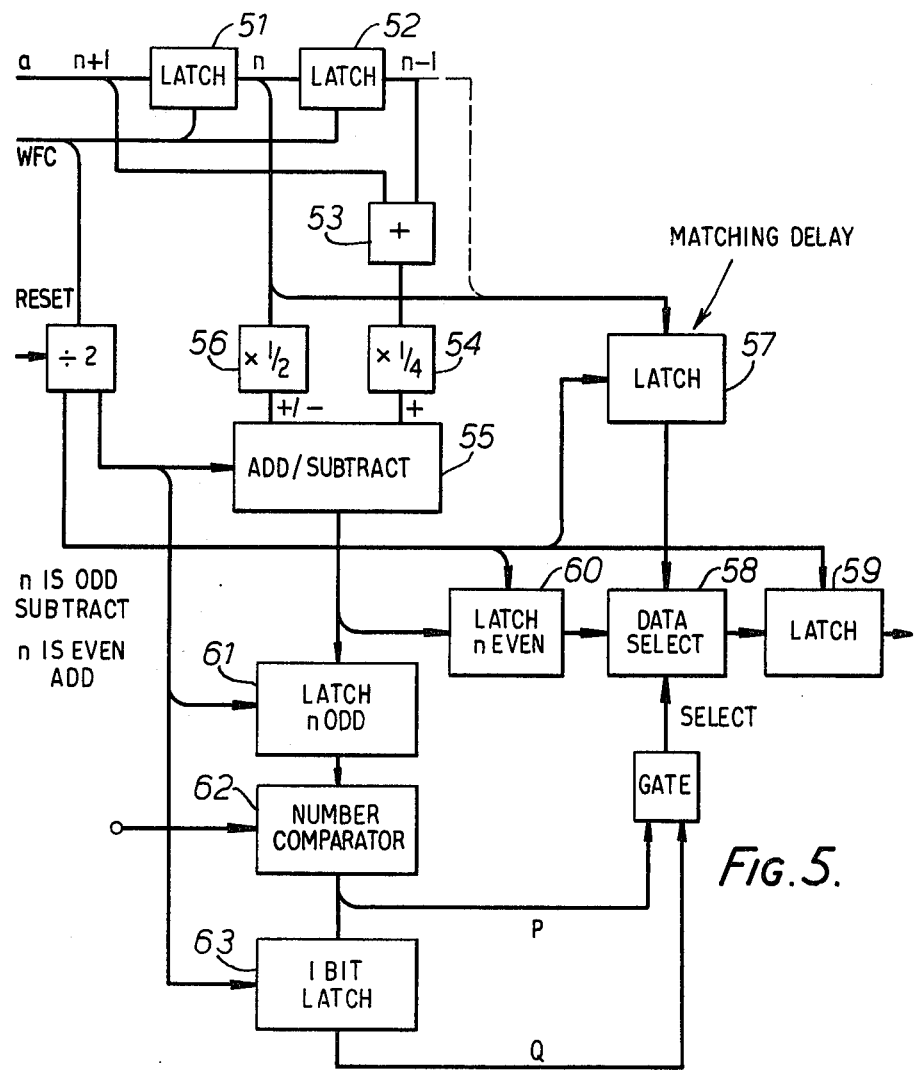
FIG. 5 shows an embodiment of a one dimensional filter according to the present invention.

FIG. 5 shows a preferred embodiment of a combined input filter and apparatus for monitoring the input signal to ascertain if it has been previously filtered. Such a combination is not necessary but is felt to be advantageous as it monitors on a word by word basis which is almost essential for "Chroma Keying" for example. The filter part of the circuit is similar to that shown in FIG. 2.

Input words a are fed to a latch 51 and then to a further latch 52 in series with the latch 51 and both controlled by a clock signal at word frequency. An adding circuit 53 adds together the input word $n+1$ and the output from latch 52 which was input word $n-1$ and the resultant added signal is fed via a multiplying or scaling circuit 54 to an add/subtract circuit 55 where the output of latch 51 representing input word n is, after scaling by 56 either added to it or subtracted from it. The output of the latch 51 is also fed to a further latch 57 whose output is fed to one input of a data selector 58. The output of the data selector circuit 58 is fed to a latch 59. The other input to the data selector circuit 58 is supplied with alternate output signals from the add-/subtract circuit 55 via a latch 60.

The output of the latch 60 is identical to the output of the latch 22 shown in FIG. 3 and thus if the data selector circuit 58 is controlled to receive data from the latch 60, the output from the latch 59 is a digitally filtered signal.

The purpose of the remainder of the circuit shown in FIG. 5 is to control the operation of the data selector circuit 58 by monitoring the input to the circuit to ascertain if it has already been filtered and to switch the data selector circuit 58 to receive signals from the latch 57 which are, it will be appreciated, not subject to filtering by the circuit shown in FIG. 5. Hence in this case the output from the latch 59 is simply identical to the input to the circuit but with alternate words omitted.

The monitoring is achieved by feeding the output from the add/subtract circuit 55 to a further latch 61 which is clocked at the same frequency as the latch 60 but in anti-phase therewith, and to compare the output of the latch 61 in a comparator circuit 62 with a reference number or band, e.g., 0 or +1 to −1. The output of the comparator is a binary digit indicative of whether or not the input signal has been previously filtered.

A one-bit latch 63 is provided for timing purposes and the input and output of the latch 63 are fed as inputs to a gate circuit 64 used to control the switching of the data selector circuit 58.

The above described embodiment reduces the word rate by a factor of two. Other factors can be used, e.g., 4 with consequent alteration to the circuit described above.

As was stated previously, the filter section of FIG. 5 may be quite separate from the monitoring section in which case the filter would be identical to that shown in FIG. 2. One advantage of the preferred embodiment is that it would only be necessary to replace existing input filters on existing apparatus.

Figure 6:
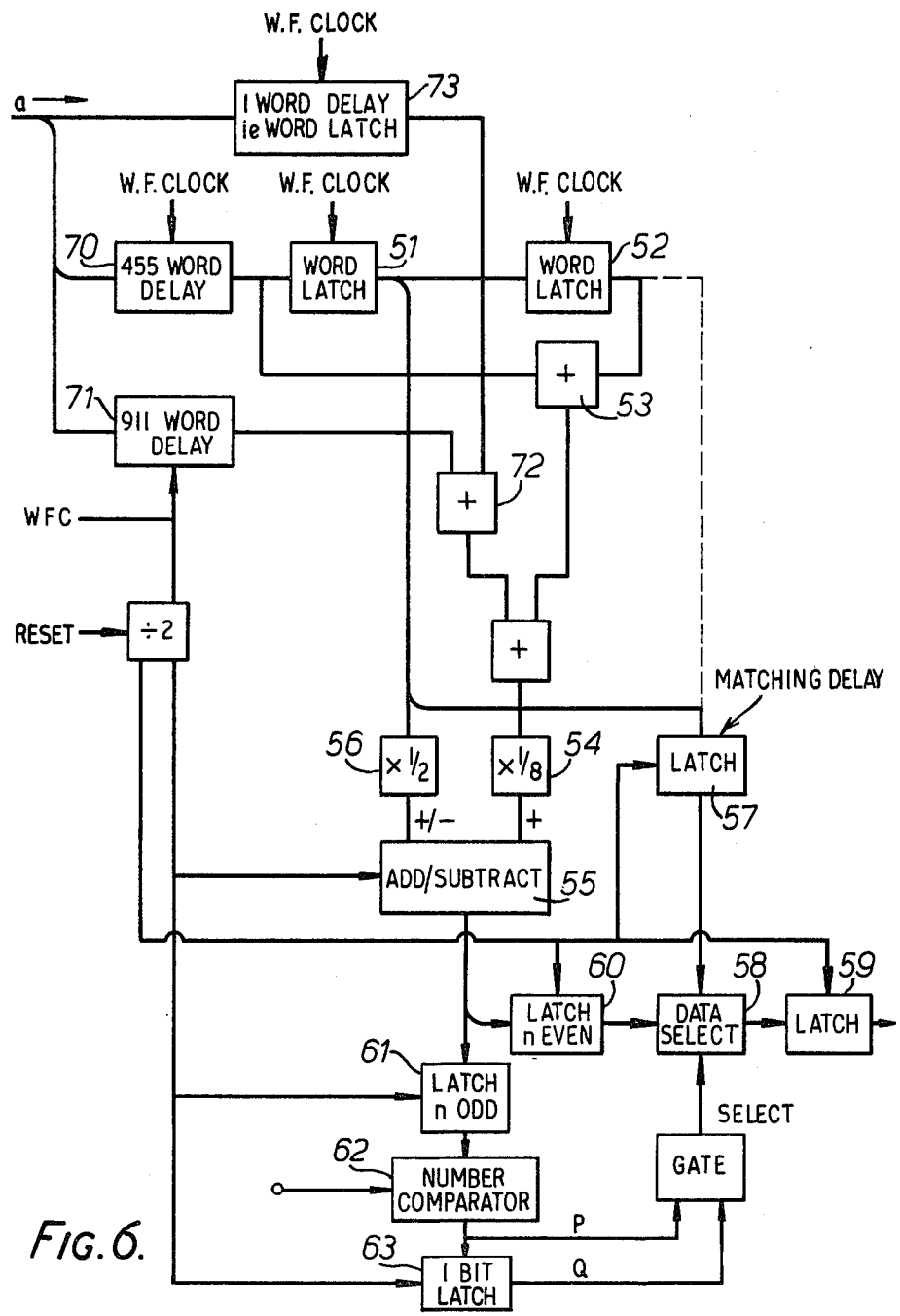
FIG. 6 shows an embodiment of a two dimensional filter according to the present invention.

FIG. 6 shows an embodiment for a two dimensional filter according to specific case 1 referred to above for halving the number of samples from 455 to 277½. The lower part of the diagram is identical in operation to the lower part of FIG. 5 and the upper part is of analogous operation to the upper part of FIG. 5. In this case 455 samples are assumed to be taken per line of video.

In view of the similarities between FIGS. 5 and 6 like parts are identified by like reference numerals and a detailed description of these parts will not be given. However, in order to construct a two-dimensional filter addition circuitry is required and this will now be described.

Basically, for a two-dimensional filter such as specific case 1, it is necessary to provide a one-line delay circuit and a two-line delay circuit. In FIG. 6, the one-line delay circuit is the 455 word delay circuit 70 and the two-line delay circuit is the 911 word delay circuit 71. The output of the circuit 70 is fed to the word latch 51 while the output of the circuit 71 is fed to an adder circuit 72 where it is added to the output of a further word latch 73. The output of the adder circuit 72 is fed to a further adder circuit 73 where it is added to the output of the adder circuit 53 before being fed to the scaling circuit 54.

I claim:

1. In an apparatus for processing signals in the form of digital words, comprising (a) filtering means having an input terminal for receiving a sequence of input digital words, and an output terminal for supplying a sequence of filtered words; (b) selection means having input and output terminals, said selection means input terminal being connected with the output terminal of said filtering means, said selection means being operable to omit predetermined words from the sequence thereof and for supplying a reduced number of digital words to said selection means output terminal; and (c) output means connected with said selection means output terminal for acting upon the reduced number of words;

the improvement which comprises (d) monitoring means connected with the input terminal of said filtering means for determining if the input digital words have a characteristic similar to the filtered words; and (e) bypass means operable by said monitoring means when said monitoring means determines that an input digital word has a characteristic similar to a filtered word for causing the input digital word to bypass said filter means and thereby remain in the non-altered condition.

2. Apparatus as defined in claim 1, wherein said monitoring means includes means for producing digital outputs which are functions of the digital input words, means for combining said digital outputs, and means for comparing selected ones of said combined digital outputs with a reference signal, thereby to determine whether the input digital words have a characteristic similar to filtered words.

3. Apparatus as defined in claim 1, wherein said bypass means comprises a data selector circuit arranged to receive as inputs both input digital words and filtered words, said data selector circuit being operable to output one of said inputs under the control of the monitoring means.

4. Apparatus as defined in claim 1, wherein said filtering means has a characteristic such that there is only one non-zero multiplying coefficient in the set of coefficients spatially separated by a number of words equal to the number of initial words per unit time divided by the reduced number of words per unit time.

5. Apparatus as defined in claim 4, wherein said reducing means is arranged to divide in half the number of output digital words, said monitoring means being arranged to operate on the words which are not fed to the output means for acting upon the reduced number of words.

6. Apparatus as defined in claim 4, wherein said filtering means includes means for producing digital outputs which are functions of the input digital words, and means for combining said digital outputs to produce said filtered words.

7. Apparatus as defined in claim 6, wherein said monitoring means utilizes the digital output producing means and the combining means of said filtering means, and further including means for comparing the combined digital outputs with a reference signal, thereby to determine whether the input digital words have a characteristic similar to filtered words.

8. Apparatus as defined in claim 3, wherein the apparatus is utilized for recording T.V. video signals, said filtering means being a one-dimensional filter.

9. Apparatus as defined in claim 3, wherein the apparatus is utilized for recording T.V. video signals, said filtering means being a two-dimensional filter.

10. Apparatus as defined in claim 9, wherein an odd number of zero terms are included in the filtering means.

* * * * *